United States Patent
Xiong

(10) Patent No.: US 9,240,726 B1
(45) Date of Patent: Jan. 19, 2016

(54) DIMMING LED DRIVER CIRCUIT WITH DYNAMICALLY CONTROLLED RESONANT TANK GAIN

(71) Applicant: Universal Lighting Technologies, Inc., Madison, AL (US)

(72) Inventor: Wei Xiong, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 14/274,379

(22) Filed: May 9, 2014

Related U.S. Application Data

(60) Provisional application No. 61/824,159, filed on May 16, 2013.

(51) Int. Cl.
*H05B 37/02* (2006.01)
*H02M 3/335* (2006.01)

(52) U.S. Cl.
CPC ........... *H02M 3/33507* (2013.01); *H05B 37/02* (2013.01)

(58) Field of Classification Search
CPC ........... H05B 33/0815; H05B 41/3921; H05B 41/2824; H05B 41/36
See application file for complete search history.

(56) References Cited

U.S. PATENT DOCUMENTS

| | | | |
|---|---|---|---|
| 2013/0127358 A1* | 5/2013 | Yao | 315/201 |
| 2013/0147376 A1* | 6/2013 | Trainor et al. | 315/200 R |
| 2013/0194831 A1* | 8/2013 | Hu | 363/21.01 |
| 2013/0300310 A1* | 11/2013 | Hu | 315/239 |

* cited by examiner

*Primary Examiner* — Douglas W Owens
*Assistant Examiner* — Raymond R Chai
(74) *Attorney, Agent, or Firm* — Patterson Intellectual Property Law, P.C.; Mark J. Patterson

(57) ABSTRACT

A constant current driver circuit based on a half-bridge resonant topology has a variable capacitance circuit. The driver circuit operates the half-bridge inverter at a fixed frequency. The variable capacitance circuit is configured to vary the effective capacitance of the resonant tank of the driver circuit. The driver circuit can be configured to maintain soft-switching over a wide output current range (e.g., dimming range) by selecting a resonant capacitor value effective to maintain soft switching given the fixed frequency of the half-bridge inverter.

12 Claims, 4 Drawing Sheets

DIMMING LED DRIVER CIRCUIT WITH DYNAMICALLY CONTROLLED RESONANT TANK GAIN

CROSS-REFERENCES TO RELATED APPLICATIONS

This application claim priority to and hereby incorporates by reference in its entirety U.S. Provisional Patent Application Ser. No. 61/824,159 entitled "DIMMING LED DRIVER CIRCUIT WITH DYNAMICALLY CONTROLLED RESONANT TANK GAIN" filed on May 16, 2013.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The light emitting diode (LED) lighting market is expanding as the cost of LED lighting decreases. As compared to incandescent lamps, fluorescent lamps, and other light sources, LEDs have a longer service life and can be dimmed without impairing the service life of the LED. Dimmable LED drivers with wide range dimming capability are desirable.

There are two basic methods to accomplish the dimming function in LED driver circuits. In buck converter and buck-boost converter LED driver circuits, pulse width modulation duty cycle variation is used to reduce the output current to the LED (i.e., dim the LED light source). In half-bridge resonant type driver circuits (which are often isolated), frequency control of the half-bridge resonant inverter is used to reduce output current to the LED light source. Both driver circuit topologies and methods have hard-switching problems and frequency limiting problems when dimming. This makes switch (e.g., MOSFET) selection difficult (e.g., balancing the competing interests of cost, size, and robustness) and the switches selected may reduce circuit efficiency and/or reliability.

Referring to FIG. 1, a prior art frequency controlled half-bridge resonant type driver circuit 100 works well for certain range dimming control. By changing the switching frequency of the half-bridge inverter 102, the resonant tank circuit 104 output can be predictably altered and controlled. As the dimming range is increased, the switching frequency range of the half-bridge must also be increased. However, if the switching frequency of the half-bridge inverter 102 is too high, there is not enough current going through the resonant inductor Lres to maintain soft-switching. To maintain soft-switching in the half-bridge inverter 102, the switching frequency must be limited. Thus, there is a practical maximum frequency limit and corresponding minimum dimming level for driver circuits based on the half-bridge resonant topology.

BRIEF SUMMARY OF THE INVENTION

Aspects of the invention include a constant current driver circuit based on a resonant half-bridge inverter topology. The driver circuit operates the half-bridge inverter at a fixed frequency. The variable capacitance circuit varies the effective capacitance of the resonant tank of the driver circuit. The driver circuit can be configured to maintain soft-switching over a wide output current range (e.g., dimming range) by selecting a resonant capacitor value effective to maintain soft switching given the fixed frequency of the half-bridge inverter.

In one aspect, a driver circuit provides a current to a load. The driver circuit includes a half-bridge inverter, a resonant tank circuit, an output transformer, a rectifier, and a variable capacitance circuit. The half-bridge inverter has an input, and output, and a circuit ground. The input connects to a direct current (DC) power rail. The resonant tank circuit has an input connected to the output of the half-bridge inverter. The output transformer has an input connected to the output of the resonant tank circuit. The rectifier is connected between the output transformer and the load. The variable capacitance circuit is connected between the output of the half-bridge inverter and the circuit ground of the half-bridge inverter. The variable capacitance circuit varies a capacitance of the variable capacitance circuit as a function of a control signal.

In another aspect, a light fixture receives alternating current (AC) power from a power supply and provides illumination. The light fixture includes a light source, and input stage, a driver circuit, and a housing. The light source provides light in response to receiving a current. The input stage receives AC power from the power supply and provides a direct current (DC) power rail. The driver circuit provides the current to the light source. The driver circuit includes a half-bridge inverter, a resonant tank circuit, an output transformer, a rectifier, and a variable capacitance circuit. The half-bridge inverter has an input, and output and a circuit ground. The input of the half-bridge inverter is connected to the DC power rail of the input stage. The resonant tank circuit has an input connected to the output of the half-bridge inverter. The output transformer has an input connected to the output of the resonant tank circuit. The rectifier is connected between the output transformer and the light source. The variable capacitance circuit is connected between the output of the half-bridge inverter and the circuit ground of the half-bridge inverter. The variable capacitance circuit varies a capacitance and variable capacitance circuit as a function of a control signal. The housing supports the light source, the input stage, and the driver circuit.

BRIEF DESCRIPTION OF THE SEVERAL VIEWS OF THE DRAWINGS

Reference will now be made in detail to optional embodiments of the invention, examples of which are illustrated in accompanying drawings. Whenever possible, the same reference numbers are used in the drawing and in the description referring to the same or like parts.

DETAILED DESCRIPTION OF THE INVENTION

Figure 1:
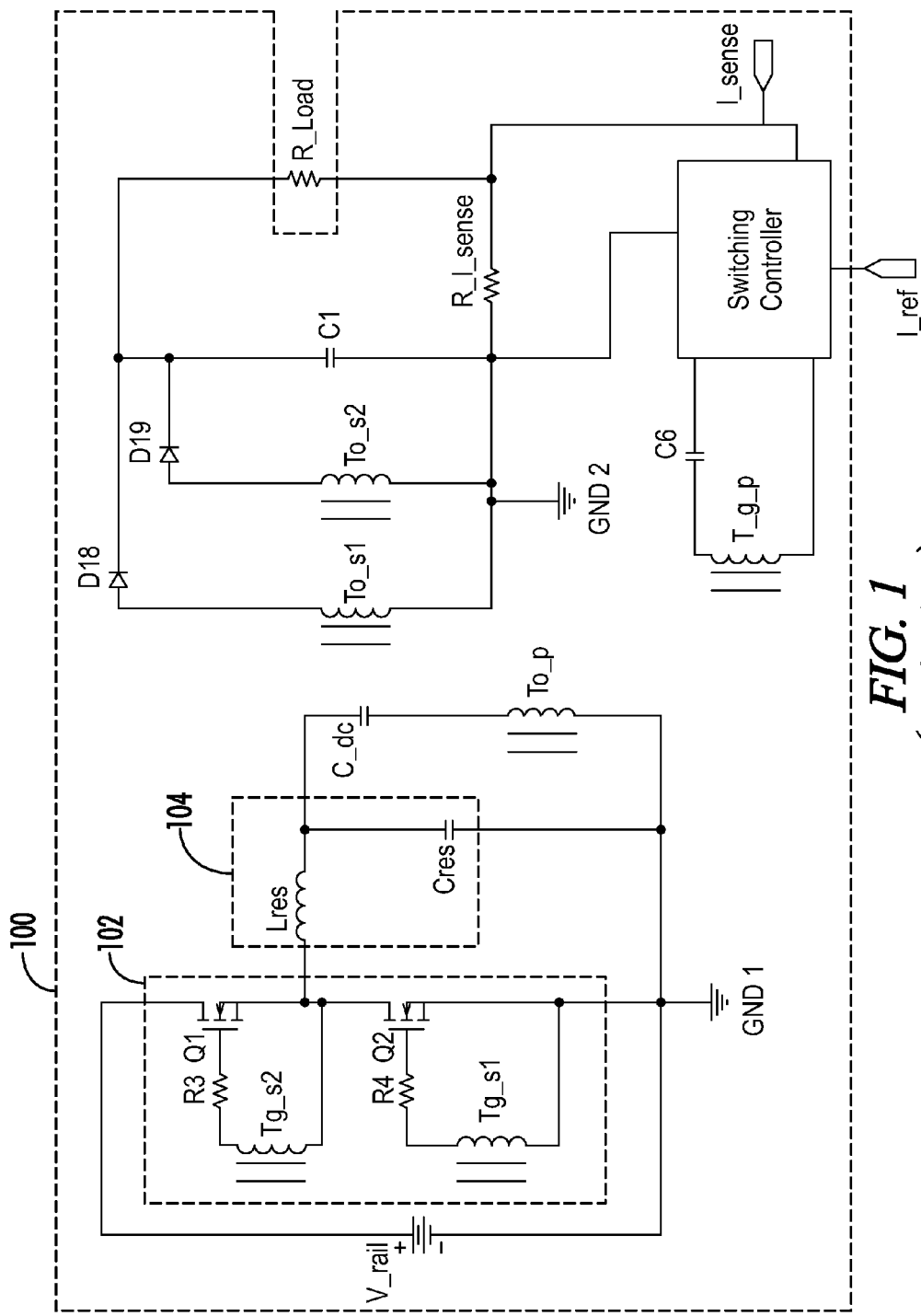
FIG. 1 is a partial schematic and block diagram of a prior art driver circuit having an isolated frequency controlled half-bridge resonant topology.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims.

The term "when" is used to specify orientation for relative positions of components, not as a temporal limitation of the claims or apparatus described and claimed herein unless otherwise specified.

The phrase "in one embodiment," as used herein does not necessarily refer to the same embodiment, although it may. Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function.

The terms "switching element" and "switch" may be used interchangeably and may refer herein to at least: a variety of transistors as known in the art (including but not limited to FET, BJT, IGBT, JFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

As used herein, "ballast" and "driver circuit" refer to any circuit for providing power (e.g., current) from a power source to a light source. Additionally, "light source" refers to one or more light emitting devices such as fluorescent lamps, high intensity discharge lamps, incandescent bulbs, and solid state light-emitting elements such as light emitting diodes (LEDs), organic light emitting diodes (OLEDs), and plasmaloids. Further, "connected between" or "connected to" means electrically connected when referring to electrical devices in circuit schematics or diagrams.

Figure 2:
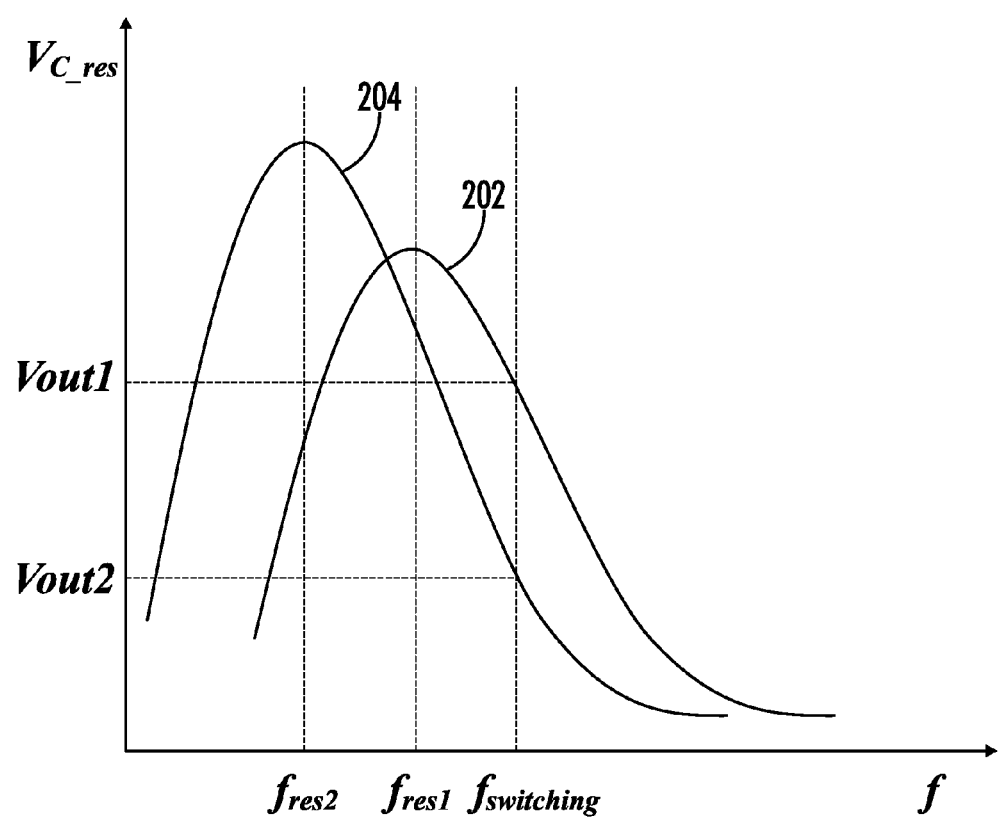
FIG. 2 is a graphical plot of resonant capacitor voltage versus frequency for a half-bridge resonant driver circuit.

Referring to the prior art driver circuit of FIG. 1, energy stored in the resonant capacitor Cres is transferred to the output of the driver circuit 100 by the output transformer To. The voltage across the resonant capacitor Cres is thus directly related to the power output by the driver circuit 100. Changing the frequency of the voltage across the resonant capacitor Cres alters the output power at the output of the driver circuit 100. FIG. 2 includes a first curve 202 showing the resonant capacitor Cres voltage for a first capacitance value across a broad range of switching frequencies for the half-bridge inverter 102 A second curve 204 shows the resonant capacitor Cres voltage for a second capacitance value across the range of switching frequencies. For a given switching frequency of the half-bridge inverter 102, the voltage across the resonant capacitor Cres (and thus the power at the output of the driver circuit 100) changes for different values of capacitance for the resonant capacitor Cres.

The voltage across the resonant capacitor Cres is can be calculated using Equation 1 as follows:

$$V_{out}(C_{res}) = \left| \frac{N^2 \cdot R_{load}}{j \cdot 2 \cdot \pi \cdot f \cdot (L_{res} + C_{res}) - (2 \cdot \pi \cdot f)^2 \cdot L_{res} \cdot C_{res} \cdot (N^2 \cdot R_{load})} \right|$$

In Equation 1, N is the turns ratio of the output transformer To, $L_{res}$ is the inductance of the resonant inductor Lres, Cres is the capacitance of the resonant capacitor Cres, f is the switching frequency of the half-bridge inverter 102, and $R_{load}$ is the resistance of the load R_Load. Increasing the capacitance of the resonant capacitor Cres reduces the power output by the driver circuit because increasing Cres lowers the resonant frequency of the resonant tank, increasing the difference between the resonant frequency and the switching frequency of the half-bridge inverter 102. Referring again to FIG. 2, the second curve 204 is the voltage curve corresponding to an increased resonant capacitor Cres capacitance. The first curve 202 is the voltage curve corresponding to a decreased or base resonant capacitor Cres capacitance. Maintaining the resonant frequency of the driver circuit 100 below the switching frequency of the half-bridge inverter 102 provides for soft switching of the upper switch Q1 and lower switch Q2 in the half-bridge inverter 102. The output power from the driver circuit 100 can thus be modified by changing the resonant frequency of the driver circuit 102 such as by altering the capacitance at the output of the half-bridge inverter 102.

Figure 3:
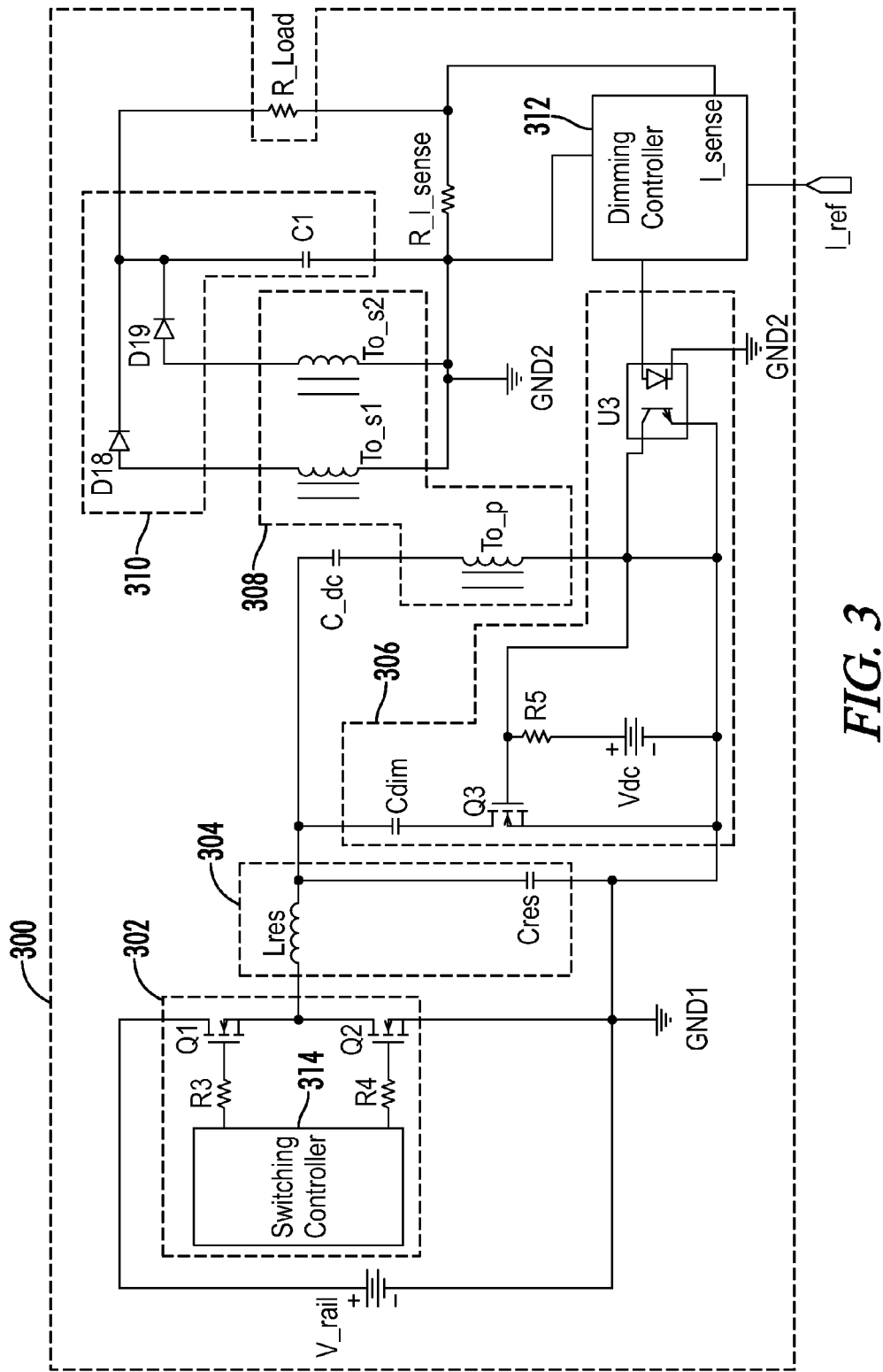
FIG. 3 is a partial schematic and block diagram of a driver circuit having an isolated fixed frequency half-bridge resonant topology including a variable capacitance circuit.
Figure 4:
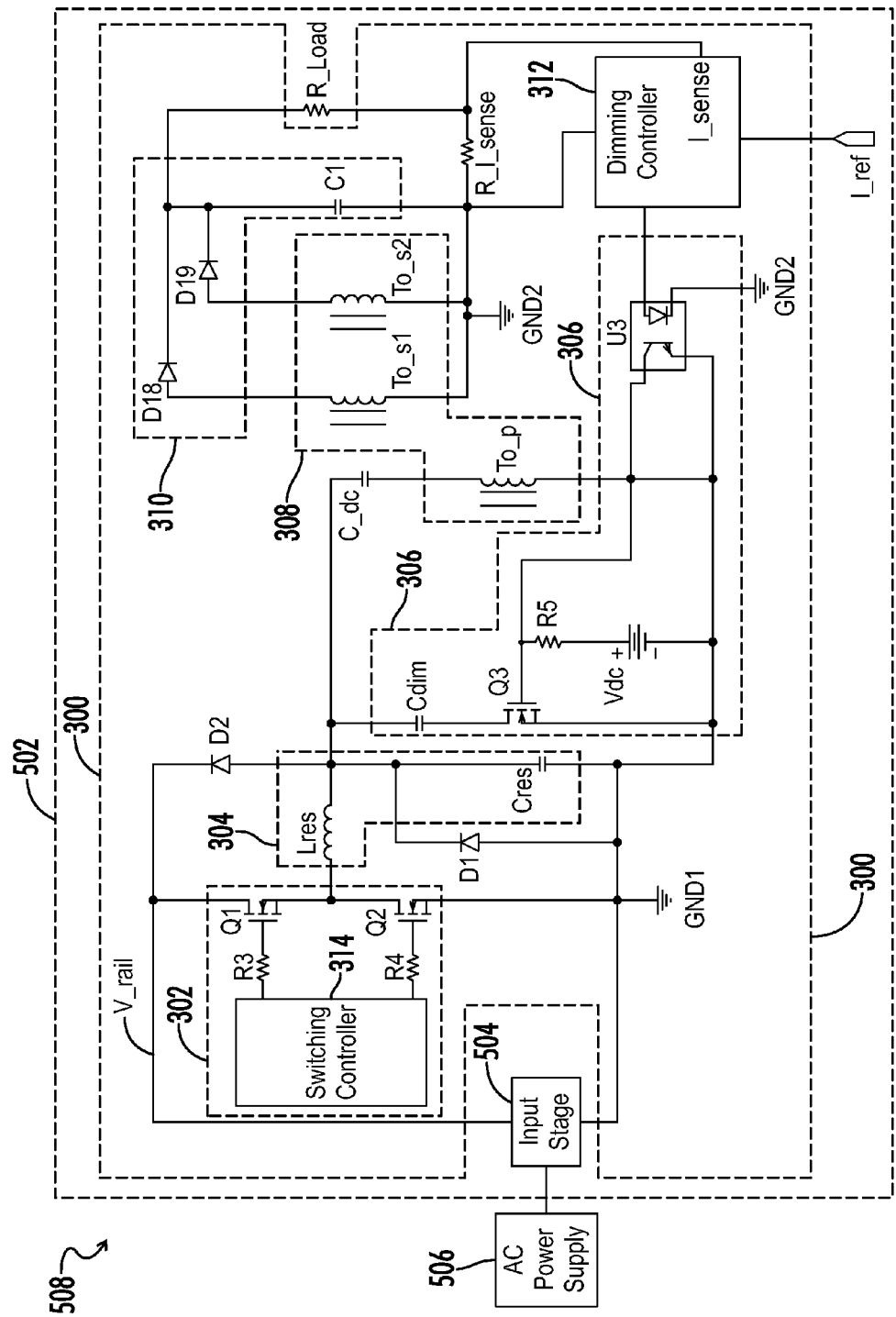
FIG. 4 is a partial schematic and block diagram of a light fixture including a driver circuit having an isolated fixed frequency half-bridge resonant topology including a variable capacitance circuit and clamping diodes.

Referring to FIGS. 3 and 4, a driver circuit 300 includes a half-bridge inverter 302, a resonant tank circuit 304, an output transformer 308, a rectifier 310, a variable capacitance circuit 306, and a dimming controller 312. The half-bridge inverter 302 has an input, and output, and a circuit ground GND1. The input of the half-bridge inverter 302 is connected to a DC power rail V_rail. The half-bridge inverter 302 receives power from the DC power rail V_rail and provides an AC current signal at the output of the half-bridge inverter 302. In one embodiment, the driver circuit 300 further includes a switching controller 314 to provide a fixed frequency drive signal to an upper switch Q1 and a lower switch Q2 of the half-bridge inverter 302. In one embodiment, the switching controller 314 drives the half-bridge inverter 302 in a single, predetermined fixed frequency. The switching controller 314 may be considered integral with the half-bridge inverter 302 or separate from the half-bridge inverter 302. The switching controller 314 may implemented distinct from the dimming controller 312 or integrated with the dimming controller 312.

The resonant tank circuit 304 has an input and an output. The input of the resonant tank circuit 304 is connected to the output of the half-bridge inverter 302. The resonant tank circuit 304 receives the AC signal from the half-bridge inverter 302 and provides a resonant AC signal to the output transformer 308.

The output transformer 308 has an input connected to the output of the resonant tank circuit 304. In one embodiment, the driver circuit 300 includes a DC blocking capacitor C_DC connecting the input of the output transformer 308 to the output of the resonant tank circuit 304. The output transformer 308 receives the resonant AC signal from the resonant tank circuit 304 and provides a first AC output and a second AC output to the rectifier 310.

The rectifier 310 is connected between the output transformer 308 and the load R_load. The rectifier 310 receives the first AC output and the second AC output from the output transformer 308 and provides a DC current to the load R_load. In one embodiment, the rectifier 310 has an output ground GND2 that is isolated from the circuit ground GND1 of the half-bridge inverter 302 by the output transformer 308.

The variable capacitance circuit 306 is connected between the output of the half-bridge inverter 302 and the circuit ground GND1. The variable capacitance circuit 306 varies the capacitance as a function of a control signal. In one embodiment, the variable capacitance circuit 306 includes a dimming capacitor Cdim and a switch Q3. The switch Q3 is connected in series with the dimming capacitor Cdim between the output of the half-bridge inverter 302 and the circuit ground GND1.

The dimming controller 312 receives a dimming signal I_ref (e.g., user input or input from a system controller) indicative of a desired dimming level or current. The dimming controller 312 provides the control signal to the variable capacitance circuit 306 as a function of the received dimming signal I_ref. In one embodiment, the control signal is a fixed frequency pulse width modulated signal. In one embodiment, the driver circuit 300 further includes a current sensing resistor R_I_sense connected in series with the load R_load. The current sensing resistor R_I_sense provides a current signal indicative of a current through the load R_load to the dimming controller 312. In one embodiment, the dimming controller 312 adjusts a duty cycle of the control signal provided to the variable capacitance circuit 306 as a function of the current signal. In one embodiment, the dimming controller 312 increases a duty cycle of the control signal to reduce the current through the load R_load and/or decreases the duty cycle of the control signal to increase the current through the load R_load such that the current indicated by the current signal matches the current indicated by the dimming signal I_ref.

In one embodiment, the dimming controller 312 and current signal provided by the current sensing resistor R_I_sense are referenced to the output ground GND2 of the rectifier 310. The variable capacitance circuit 306 further includes an opto-coupler U3, a pull-down resistor R5, and a DC voltage source Vdc. The opto-coupler U3 is connected between the dimming controller 312 and the switch Q3 (i.e., a control terminal of the switch Q3). The opto-coupler U3 provides the control signal from the dimming controller 312 to the switch Q3 while maintaining electrical isolation between the circuit ground GND1 of the half-bridge inverter 302 and the output ground GND2 of the rectifier 310. The pull-down resistor R5 is connected to the control terminal of the switch Q3. The DC voltage source Vdc is connected in series with the pull-down resistor R5 between the control terminal of the switch Q3 and the circuit ground GND1 of the half-bridge inverter 302. In one embodiment, the DC voltage source Vdc is a DC voltage provided from the DC power rail V_rail via a voltage regulator or other DC voltage supply circuit.

The dimming capacitor Cdim is thus connected in parallel with the resonant capacitor Cres through the switch Q3 (i.e., connected in parallel when the switch Q3 is on and irrelevant when the switch Q3 is off) when the dimming controller turns the switch Q3 on (i.e., allows current flow through the switch Q3). When the switch Q3 is on, the effective resonant capacitance of the driver circuit 300 is the sum of the capacitance of the resonant capacitor Cres and the dimming capacitor Cdim. When the switch Q3 is off, the effective resonant capacitance of the driver circuit 300 is the capacitance of the resonant capacitor Cres.

The effective resonant capacitance $C_{res\_eq}$ during operation of the driver circuit 300 can thus be expressed as shown in Equation 2 as follows:

$$C_{res\_eq} = D_{on} \cdot C_{dim} + C_{res}$$

In Equation 2, $C_{dim}$ is the capacitance of the dimming capacitor Cdim, Cres is the capacitance of the resonant capacitor Cres, and $D_{on}$ is the percentage duty cycle of the control signal provided to the switch Q3 by the dimming controller 312. By controlling the duty cycle of the switch Q3, the effective resonant capacitance of the driver circuit 300 can be controllably varied to control the output current of the driver circuit 300 to the load R_load.

Equation 3 below shows the relationship between output voltage of the driver circuit 300 and effective capacitance.

$$V_{out}(C_{res}) = \left| \frac{N^2 \cdot R_{load}}{j \cdot 2 \cdot \pi \cdot f \cdot (L_{res} + D_{on} \cdot C_{dim} + C_{res}) - (2 \cdot \pi \cdot f)^2 \cdot L_{res} \cdot (D_{on} \cdot C_{dim} + C_{res}) \cdot (N^2 \cdot R_{load})} \right|$$

Selecting the capacitance of the resonant capacitor Cres to provides soft switching enables soft switching for the half-bridge inverter 302 switches Q1 and Q2 because the operating frequency is fixed.

Referring to FIG. 4, a light fixture 508 includes the driver circuit 300, a housing 502, and an input stage 504. In one embodiment, the load R_load includes one or more light emitting diodes. The light fixture 508 receives AC power from a power supply 506 (e.g., line power) and provide light. The load R_load is a light source configured to provide light in response to receiving a current. The input stage 504 receives AC power from the power supply 506 and provides the DC power rail V_rail. In the embodiment of FIG. 4, the driver circuit 300 includes a first clamping diode D1 and a second clamping diode D2. The anode of the first clamping diode D1 is connected to the circuit ground GND1 of the half-bridge inverter 302. The cathode of the first clamping diode D1 is connected to the output of the half-bridge inverter 302. The anode of the second clamping diode D2 is connected to the output of the half-bridge inverter 302. The cathode of the second clamping diode D2 is connected to the DC power rail V_rail. The first and second clamping diodes D1, D2 protect the switch Q3 of the variable capacitance circuit 306.

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although embodiments of the present invention have been described in detail, it will be understood by those skilled in the art that various modifications can be made therein without departing from the spirit and scope of the invention as set forth in the appended claims.

A controller, processor, computing device, client computing device or computer, such as described herein, includes at least one or more processors or processing units and a system memory. The controller may also include at least some form of computer readable media. By way of example and not limitation, computer readable media may include computer storage media and communication media. Computer readable storage media may include volatile and nonvolatile, removable and non-removable media implemented in any method or technology that enables storage of information, such as computer readable instructions, data structures, program modules, or other data. Communication media may embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

This written description uses examples to disclose the invention and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

Thus, although there have been described particular embodiments of the present invention of a new and useful DIMMING LED DRIVER CIRCUIT WITH DYNAMICALLY CONTROLLED RESONANT TANK GAIN it is not intended that such references be construed as limitations upon the scope of this invention except as set forth in the following claims.

What is claimed is:

1. A driver circuit configured to provide a current to a load, the driver circuit comprising:
    a half-bridge inverter having an input configured to connect to a direct current (DC) power rail, an output, and a circuit ground;
    a resonant tank circuit having an input connected to the output of the half-bridge inverter and an output;
    an output transformer having an input connected to the output of the resonant tank circuit;
    a rectifier connected between the output transformer and the load;
    a variable capacitance circuit connected between the output of the half-bridge inverter and the circuit ground of the half-bridge inverter, wherein the variable capacitance circuit is configured to vary a capacitance of the variable capacitance circuit as a function of a control signal;
    the rectifier has an output ground isolated from the circuit ground of the half-bridge inverter by the output transformer;
    the driver circuit further comprises a dimming controller configured to receive a dimming signal and provide the control signal to the variable capacitance circuit as a function of the received dimming signal;
    the dimming controller is referenced to the output ground of the rectifier; and
    the variable capacitance circuit comprises
        a dimming capacitor,
        a switch connected in series with the dimming capacitor between the output of the half-bridge inverter and the ground of the half-bridge inverter, and an opto-coupler connected between the dimming controller and the switch, wherein the opto-coupler is configured to provide the control signal from the dimming controller to the switch and provide electrical isolation between the circuit ground and the output ground, a pull-down resistor connected to the control terminal of the switch, and a DC voltage source connected in series with the pull-down resistor between the control terminal of the switch and the circuit ground of the half-bridge inverter.

2. The driver circuit of claim 1, further comprising:
a switching controller connected to the half-bridge inverter, wherein the switching controller is configured to drive the half-bridge inverter at a single, predetermined fixed frequency.

3. The driver circuit of claim 1, further comprising:
a first clamping diode having an anode connected to the circuit ground and a cathode connected to the output of the half-bridge inverter; and
a second clamping diode having an anode connected to the output of the half-bridge inverter and a cathode connected to the DC power rail.

4. The driver circuit of claim 1, further comprising:
the dimming controller configured to
 receive the dimming signal,
 receive a current signal indicative of a current through the load,
 provide the control signal to the variable capacitance circuit as a function of the received dimming signal and current signal,
 increases a duty cycle of the control signal to reduce the current through the load, and
 decrease the duty cycle of the control signal to increase the current through the load.

5. The driver circuit of claim 1, wherein:
the half-bridge inverter is configured to receive power from the DC power rail and provide an alternating current (AC) signal at an output of the half-bridge inverter;
the resonant tank circuit is configured to receive the AC signal from the half-bridge inverter and provide a resonant AC signal to the output transformer;
the output transformer is configured to receive the resonant AC signal and provide a first AC output and a second AC output to the rectifier;
the rectifier is configured to receive the first AC output and the second AC output and provide a DC current to the load; and
the driver circuit further comprises a switching controller configured to provide a fixed frequency drive signal to the half-bridge inverter.

6. A light fixture configured to receive alternating current (AC) power from a power supply and provide light, the light fixture comprising:
a light source configured to provide light in response to receiving a current;
an input stage configured to receive AC power from the power supply and provide a direct current (DC) power rail;
a driver circuit configured to provide the current to the light source, the driver circuit comprising
 a half-bridge inverter having an input, an output, and a circuit ground, wherein the input is connected to the DC power rail of the input stage,
 a resonant tank circuit having an input and an output, wherein the input is connected to the output of the half-bridge inverter,
 an output transformer having an input connected to the output of the resonant tank circuit,
 a rectifier connected between the output transformer and the light source, and
 a variable capacitance circuit connected between the output of the half-bridge inverter and the circuit ground of the half-bridge inverter, wherein the variable capacitance circuit is configured to vary a capacitance of the variable capacitance circuit as a function of a control signal;
a housing configured to support the light source, the input stage, and the driver circuit;
the rectifier has an output ground isolated from the circuit ground of the half-bridge inverter by the output transformer;
the driver circuit further comprises a dimming controller configured to receive a dimming signal and provide the control signal to the variable capacitance circuit as a function of the received dimming signal;
the dimming controller is referenced to the output ground of the rectifier; and
the variable capacitance circuit comprises
 a dimming capacitor,
 a switch connected in series with the dimming capacitor between the output of the half-bridge inverter and the ground of the half-bridge inverter,
 an opto-coupler connected between the dimming controller and the switch,
 wherein the opto-coupler is configured to provide the control signal from the dimming controller to the switch and provide electrical isolation between the circuit ground and the output ground,
 a pull down resistor connected to the control terminal of the switch, and
 a DC voltage source connected in series with the pull down resistor between the control terminal of the switch and the circuit ground of the half-bridge inverter.

7. The light fixture of claim 6, wherein the driver circuit further comprises:
a switching controller connected to the half-bridge inverter, wherein the switching controller is configured to drive the half-bridge inverter at a single, predetermined fixed frequency.

8. The light fixture of claim 6, wherein the driver circuit further comprises:
a first clamping diode having an anode connected to the circuit ground and a cathode connected to the output of the half-bridge inverter; and
a second clamping diode having an anode connected to the output of the half-bridge inverter and a cathode connected to the DC power rail.

9. The light fixture of claim 6, wherein the driver circuit further comprises:
the dimming controller configured to
 receive the dimming signal,
 receive a current signal indicative of a current through the light source,
 provide the control signal to the variable capacitance circuit as a function of the received dimming signal and current signal,
 increases a duty cycle of the control signal to reduce the current through the light source, and decrease the duty cycle of the control signal to increase the current through the light source.

10. The light fixture of claim 6, wherein:
the half-bridge inverter is configured to receive power from the DC power rail and provide an AC signal at an output of the half-bridge inverter;
the resonant tank circuit is configured to receive the AC signal from the half-bridge inverter and provide a resonant AC signal to the output transformer;
the output transformer is configured to receive the resonant AC signal and provide a first AC output and a second AC output to the rectifier;
the rectifier is configured to receive the first AC output and the second AC output and provide a DC current to the load; and
the driver circuit further comprises a switching controller configured to provide a fixed frequency drive signal to the half-bridge inverter.

11. The light fixture of claim 6, wherein the light source comprises a light emitting diode.

12. The light fixture of claim 6, wherein the driver circuit further comprises:
the dimming controller configured to
receive the dimming signal,
receive a current signal indicative of a current through the light source,
provide the control signal to the variable capacitance circuit as a function of the received dimming signal and current signal,
increases a duty cycle of the control signal to reduce the current through the light source, and
decrease the duty cycle of the control signal to increase the current through the light source; and
a current sensing resistor connected in series with the light source, the current sensing resistor configured to provide the current signal to the dimming controller, wherein the current signal is referenced to an output ground of the driver circuit.

* * * * *